June 7, 1966 J. F. QUAAS ETAL 3,254,868
SUPPORT FOR TORCH
Filed March 27, 1964
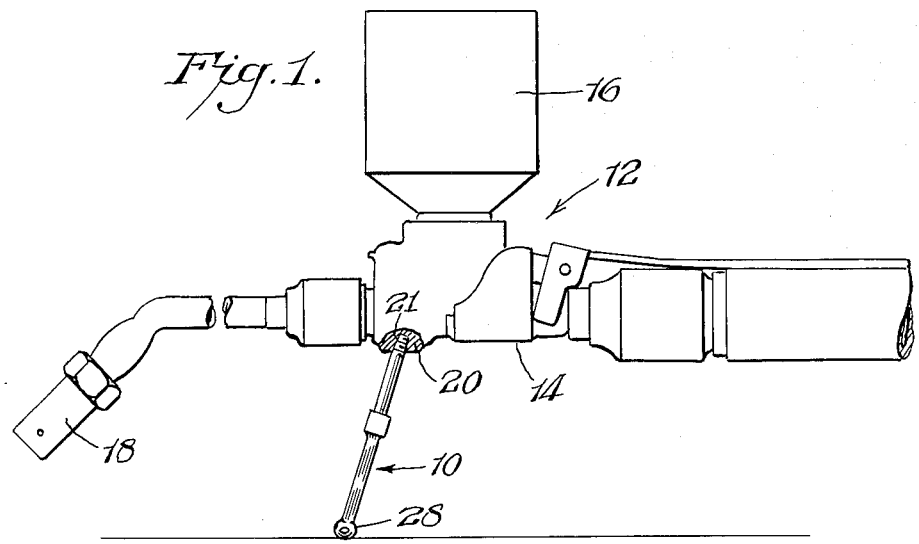
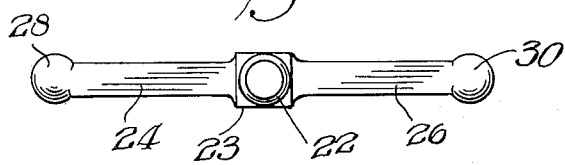
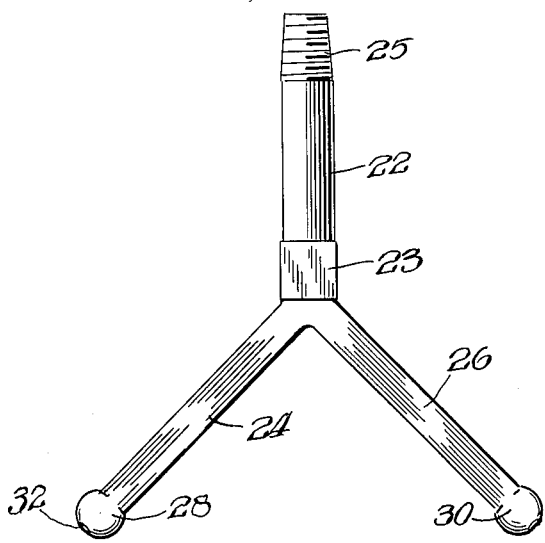
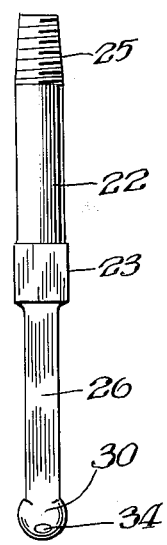
INVENTORS:
Joseph F. Quaas,
John P. Broderick,
Frank G. Lohnes,
Frederick Theodore Wishnie.
BY Connolly and Hutz
ATTORNEYS

United States Patent Office

3,254,868
Patented June 7, 1966

3,254,868
SUPPORT FOR TORCH
Joseph F. Quaas, Island Park, John P. Broderick, Bayside, Frank G. Lohnes, Glen Cove, and Frederick Theodore Wishnie, Seaford, N.Y., assignors to Eutectic Welding Alloys Corporation, Flushing, N.Y., a corporation of New York
Filed Mar. 27, 1964, Ser. No. 355,196
4 Claims. (Cl. 248—176)

This application is a continuation-in-part of co-pending application Serial No. 289,474, filed June 21, 1963.

This invention relates to a support for a gas torch for fusing and brazing, and it more particularly relates to such a support for a torch for flame spraying coatings from a powder.

Flame spraying torches are usually provided with supports or bench rests. It is difficult to make these supports stable without making them too clumsy and bulky for manual gripping. It is also desirable to provide the torches with guides for various welding operations such as edge or fillet welds. Additionally, it is necessary to store the torches in such a manner that the tip is protected. Although it is desirable to provide these torches with supports, gripping devices, weld guides and hanging devices, this auxiliary equipment should not be to complicated or expensive.

An object of this invention is to provide a simple and convenient support and manual grip for a gas welding torch.

Another object is to provide such a device which is also useful as an operating guide and wall hanger.

In accordance with this invention an inverted Y-shaped support has a stem connected to the torch and a pair of diverging legs extending from it. The stem is approximately two to four inches long, and the torch may be conveniently held by wrapping three fingers around the stem and hooking the small finger around one of the legs. The lower ends of the legs are spaced approximately two to five inches apart and the angle between them is approximately 60° to 120° to provide a stable bench rest. The torch may be hung on a vertical surface with its tip up by positioning the legs between spaced pegs or nails. The support also serves as a convenient guide and steady rest for edge welding by straddling the legs over the edge to be welded. Despite its compactness, this support is remarkably effective for a multiplicity of functions.

Novel features and advantages of the present invention will become apparent to one skilled in the art from a reading of the following description in conjunction with the accompanying drawings wherein similar reference characters refer to similar parts and in which:

FIG. 1 is a side view in elevation of one embodiment of this invention assembled on a torch;

FIG. 2 is a top plan view of the embodiment shown in FIG. 1;

FIG. 3 is a front view in elevation of the embodiment shown in FIG. 1; and

FIG. 4 is a side view in elevation of the embodiment shown in FIGS. 1–3.

As shown in FIG. 1 support 10 is secured to flame spraying torch 12 which is for example of the type shown in commonly assigned copending application, Serial No. 289,474, filed, June 21, 1963, of which this application is a continuation-in-part. Torch 12 includes a body portion 14, a powder container 16, and a flexible flame ejecting tip 18 which may be swiveled to a number of different positions. Body 14 includes a threaded boss 20 for engaging the top of support 10.

As shown in FIGS. 2–4 support 10 is an inverted Y with a short stem 22 having a threaded tapered end 25 which engages within boss 20 of torch 12. Boss 20 has an internal pipe thread 21 which is correspondingly threaded to receive external pipe thread 25. The pipe threads securely fix the parts in angular positions to which they are adjusted.

Connected to the lower end of stem 22 are a pair of diverging legs 24 and 26. Stem 22 is for example from approximately two to four inches long so that three fingers of the average size hand can be wrapped around stem 22 with the small finger hooked around one leg for further stability when support 10 is used as a hand grip.

As shown in FIGS. 3–4, stem 22 is, for example, two and one-half inches long with a circular cross section of approximately one-half inch diameter. The base 23 of stem 22 has a square cross-section with each side being approximately 7/16 inch wide. The tips 28 and 30 of legs 24 and 26 are for example spread from approximately two to five inches apart. The angle between legs 24 and 26 is from approximately 60° to 120° so that support 10 provides a rigid and stable bench rest for torch 12 and effectively performs its other functions. As shown in FIG. 3, tips 28 and 30 are spaced about three and one-half inches apart and extend below the tip of stem 22 for example four inches with a right angle between legs 24 and 26.

The legs are for example of square cross section with each side being 1/4 inch wide. Each ball tip 28 and 30 is for example about 3/8 inch in diameter and is provided with a flat surface 32 and 34, respectively, as shown in FIGS. 3 and 4. Flats 32 and 34 are for example 1/8 inch wide and inclined at an angle of 45° from normal.

Support 10, which is made for example as a light-weight aluminum casting, not only acts as a bench rest and hand grip, but is also a convenient guide for edge and fillet welds. When used as a guide for an edge weld, legs 24 and 26 straddle the edge to be welded thus providing a steady rest for torch 12.

Support 10 is also useful as a fillet guide since flats 32 and 34 are a natural gauge for bisecting a 90° fillet angle while at the same time providing the torch with a steady support. If flats 32 and 34 do not fit flush against the members to be joined, the torch is not centered.

Support 10 is also useful as a wall hanger for hanging torch 12 on a vertical surface with tip 18 up. Torch 12 may be conveniently hung on a vertical wall by positioning legs 24 and 26 between spaced nails or pegs. Advantageously, the nails and pegs are spaced about two inches apart and inclined upwardly at least 30°. One-piece light-weight support 10 accordingly effectively performs a wide variety of different functions despite its small and compact size.

What is claimed is:

1. A support for a torch having a body with a flame ejecting tip comprising an inverted Y-shaped member having a stem and a pair of diverging legs, fastening means for securing said stem to a body of a torch, said stem being approximately two to four inches long, said pair of diverging legs being connected to said lower end of said stem, the lower ends of said legs being spaced from approximately two to five inches apart with the angle between said legs being from approximately 60° to 120° whereby said support provides a convenient manual grip and rest for a torch and facilitates its support for storage, ball tips being disposed on said lower ends of said legs, and each of said ball tips having a flat portion at an angle of approximately 45° from normal wherein said support may be used as a guage for bisecting 90° fillet angles.

2. A support for a torch having a body with a flame ejecting tip comprising an inverted Y-shaped member having a vertical stem, a pair of diverging legs connected at their root to said stem, the space between said legs from said root of said legs outwardly being unobstructed whereby said legs are adapted to be used as a guide for edge welding, said stem being approximately two to four inches long, and the lower ends of said legs being from approximately 60° to 120° whereby said support provides a convenient manual grip and rest for a torch and facilitates its suspension for storage, said support being in combination with a torch having a body with a flame ejecting tip, and fastening means connecting said stem to said body of said torch.

3. The combination of claim 2 wherein said legs are substantially of equal length and extend at approximately equal angles away from said stem, and said angle between said legs being approximately 90°.

4. The combination of claim 2 wherein ball tips are disposed on said lower ends of said legs, and each of said ball tips having a flat portion at an angle of approximately 45° from normal whereby said support may be used as a guage for bisecting 90° fillet angles.

References Cited by the Examiner
UNITED STATES PATENTS

| | | | |
|---|---|---|---|
| 560,092 | 5/1896 | Ford et al. | 248—122 |
| 575,700 | 1/1897 | Charbonneau | 248—84 |
| 2,125,916 | 8/1938 | Halbing | 248—176 X |
| 2,341,751 | 2/1944 | Willoughby | 248—176 X |
| 2,569,304 | 9/1951 | Gledhill | 266—23 |
| 2,778,679 | 1/1957 | Lear | 248—80 X |

CLAUDE A. LE ROY, *Primary Examiner.*